No. 822,569. PATENTED JUNE 5, 1906.
D. APPLETON.
COOKING APPARATUS.
APPLICATION FILED AUG. 24, 1904.
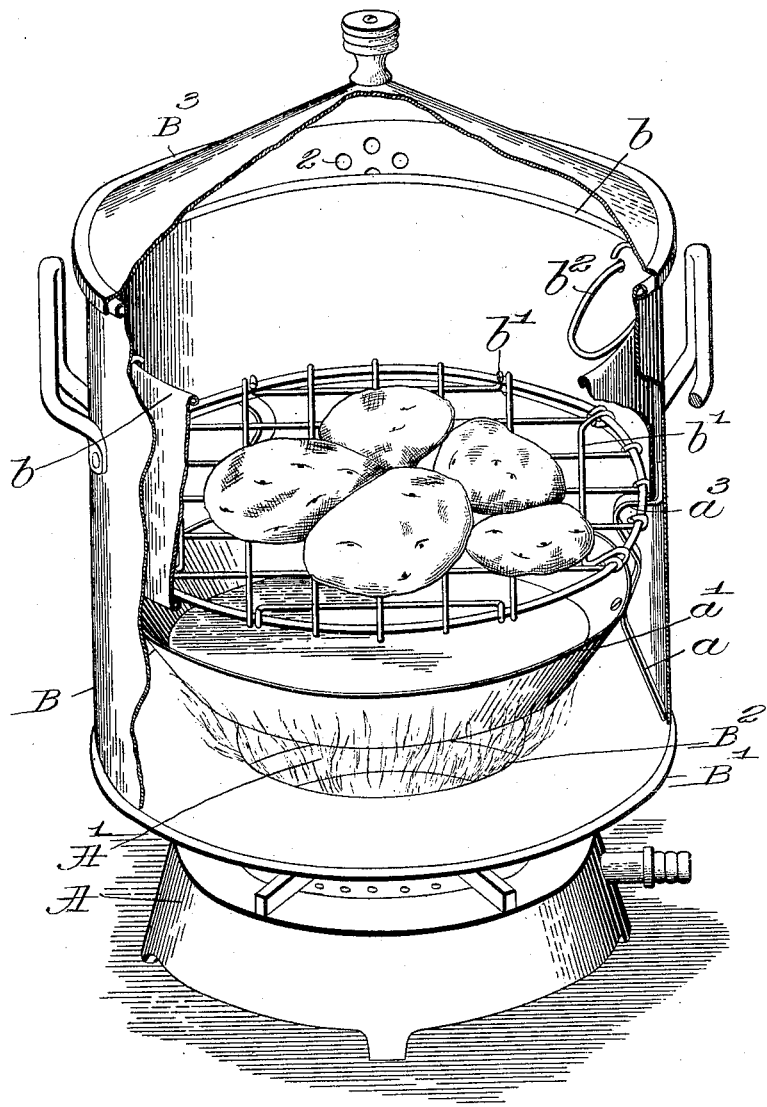

UNITED STATES PATENT OFFICE.

DAVID APPLETON, OF WEST KENSINGTON, ENGLAND.

COOKING APPARATUS.

No. 822,569.     Specification of Letters Patent.     Patented June 5, 1906.

Application filed August 24, 1904. Serial No. 221,934.

*To all whom it may concern:*

Be it known that I, DAVID APPLETON, a citizen of the United States, and a resident of West Kensington, in the county of London, England, have invented an Improvement in Cooking Apparatus, of which the following description, in connection with the accompanying drawing, is a specification, like characters on the drawing representing like parts.

This invention relates to a novel cooking apparatus, more especially intended for baking or roasting potatoes and other vegetables, although it may be used for cooking other food products.

In baking potatoes the usual practice is to place the potatoes in an oven and bake the same by dry heat, and it frequently happens that the potato when browned upon its exterior is not cooked through. The cooking apparatus herein to be described and claimed is provided to cook potatoes by the combined action of heat derived directly from a burning fuel—such, for instance, as oil or gas—and steam resulting from vaporizing water in the apparatus.

By the use of my apparatus much time is saved in cooking potatoes and other food, and the potatoes are cooked in a more thorough manner than heretofore.

The drawing shows an apparatus embodying my invention, partially broken out to illustrate the interior of the same.

Referring to the drawing, let A represent part of a gas-stove, the gas-flame issuing therefrom being represented by A'. The apparatus comprises a body, preferably cylindrical, the exterior of body having a bottom B', provided with a central opening $B^2$, through which the gas-flame may rise into the body of the apparatus. The body has fitted to its upper end a cover $B^3$. Inside the apparatus there is sustained by suitable struts $a$ $a$ a pan $a'$, in which will be placed water, and, as shown, the struts are provided above the pan with shoulders $a^3$, which serve as supports for a basket $b$, composed of metal and having an open or wire bottom $b'$, said basket having suitable handles $b^2$, the basket containing the food or articles to be cooked. The potatoes shown in the drawing are represented as sustained on the bottom of the basket; but, if desired, a vessel of any kind, tin or earthen, may be set in the basket and whatever is to be cooked laid therein.

The exterior wall B of the apparatus may be perforated—for example, as at 2—above the basket, tray, or receptacle to enable the air and products of combustion and steam to escape into the atmosphere.

In operation the apparatus is placed over a gas-stove or other suitable fire and the pan $a'$ having been supplied with water the cover is placed on the apparatus. The heat from the gas or like fire causes the water in the pan $a'$ to boil, and the steam arising therefrom serves partially to cook the potatoes or other food, and when the water in the tray has boiled entirely away the steaming process ceases and the potatoes are then baked and browned by the heated air arising from the fire in the apparatus. Preferably the cover will be of cone shape, as thereby the heated air accumulating in the apparatus is more readily directed onto the top of the potatoes.

It will be understood that the apparatus is adapted to cook articles of food other than potatoes, and, if desired, the apparatus may have several grids arranged one above the other or several chambers may be made to fit one upon the other, so that a number of different articles may be cooked at the same time.

The gas or other flame entering the apparatus might be let in through the side of the apparatus under the pan rather than through the bottom of the apparatus; but the opening in the bottom is preferable. There is sufficient space between the vertical walls of the basket and the interior of the apparatus to enable the heat arising from the combustion of gas or other fuel to pass between the basket and the body of the apparatus and striking the under side of the cover to be deflected upon the material in the basket which it is desired to cook.

Having described my invention, what I desire to claim by Letters Patent is—

1. The herein-described cooking apparatus comprising a cylindrical body having an opening in its lower end, a pan for containing water sustained within said cylindrical body directly above the said opening, a basket sustained above said pan, said basket having a perforated bottom and imperforate side walls and struts attached to the side walls of the cylindrical body for sustaining both the pan and the basket, said struts each having two shoulders, one each for sustaining the pan and basket respectively.

2. The herein-described cooking apparatus comprising a cylindrical body having an opening in its lower end, a pan for containing water sustained within said cylindrical body directly above said opening, a basket also sustained within said cylindrical body and above said pan, the aforesaid cylindrical body having perforations in its side walls at a point between its top and the top edge of the aforesaid basket whereby steam and the odors of articles being cooked may be allowed to escape from the vessel.

In testimony whereof I have signed my name to this specification in the presence of two subscribing witnesses.

DAVID APPLETON.

Witnesses:
R. WESTACOTT,
FREDK. L. RAND.